United States Patent [19]

Peot

[11] 4,306,598
[45] Dec. 22, 1981

[54] ELLIPSE CUTTING MACHINE

[75] Inventor: David G. Peot, Easley, S.C.

[73] Assignee: The Singer Company, Stamford, Conn.

[21] Appl. No.: 163,244

[22] Filed: Jun. 26, 1980

[51] Int. Cl.³ .......................... B27C 5/06; B27C 5/10
[52] U.S. Cl. .................................... 144/136 C; 33/31; 409/179; 144/134 R; 144/137
[58] Field of Search ........... 144/134 D, 136 C, 134 R, 144/136 R, 139, 137; 409/179; 33/31

[56] References Cited

U.S. PATENT DOCUMENTS

| | | | |
|---|---|---|---|
| 302,247 | 7/1884 | Harwood | 33/31 |
| 1,010,292 | 11/1911 | McKinstry | 33/31 |
| 1,031,780 | 7/1912 | Fine | 33/31 |
| 2,925,655 | 2/1960 | Beek | 33/31 |
| 2,996,804 | 8/1961 | Hancox | 33/31 |
| 3,386,337 | 6/1968 | Spier | 409/179 |

FOREIGN PATENT DOCUMENTS 4163 of 1900 United Kingdom ..................... 33/31

OTHER PUBLICATIONS

Fine Wood Working, May/Jun. 1980, No. 22, pp. 73–74.

Primary Examiner—W. D. Bray
Attorney, Agent, or Firm—Robert E. Smith; Elliot A. Lackenbach; Edward L. Bell

[57] ABSTRACT

A trammel beam carrying a pair of dove-tail shaped slider blocks rotatably carried on a pair of adjustable trammel points is attached to a workpiece support base which includes a pair of crossed right angle mutually perpendicular dove-tail tracks along which the slider blocks move as the trammel beam or workpiece support base are rotated relative one another. The trammel beam is provided with means permitting it to be mounted to a router or other cutting machine so that if the workpiece support base is attached to the surface of a workpiece, relative movement between the cutting machine and the workpiece will be restricted to an elliptical path as the movement is guided by the trammel. The means provided for mounting the trammel beam to the cutting machine permit either direct mounting of a machine such as a portable router for movement of the router around the workpiece or adjustably to a router table with the workpiece inverted between the trammel beam and the router table so that as the workpiece is rotated relative the trammel beam the workpiece will move along an elliptical path past the router cutter.

5 Claims, 4 Drawing Figures

ELLIPSE CUTTING MACHINE

DESCRIPTION

1. Field of the Invention

This invention relates to cutting machines and, more particularly, to cutting machines for making elliptical cuts in workpieces.

2. Background of the Invention

In the machining of workpieces, such as in machining wood with a router, sabre saw, or the like, it is often desirable to be able to perform the machining operation along an elliptical path. For example, elliptical cuts are useful for picture and mirror frames, table tops, inlays and carved decorations. An ellipse is a closed curve traced out by maintaining a constant sum of distances from two fixed points in a plane.

It has been long known that ellipses can be drawn by attaching a pencil or other drawing instrument to a trammel bar or beam having two trammel points adjustably spaced apart therefrom to define the lengths of the major and minor axes, respectively. The trammel points are then moved along the major and minor axes. For example, crossed mutually perpendicular tracks may be provided to restrain the trammel points to the desired major and minor axes.

Such devices are shown and described, for example, in the magazine "Fine Woodworking" May/June 1980 issue, No. 22, published by the Taunton Press, Inc., Newtown, Conn. 06470, pages 73–74.

The usefulness of such an ellipse trammel is limited, however, by the fact that the trammel tracks must fit wholly within the ellipse and, therefore, when applied to a router, or the like, small ellipses are not possible.

OBJECTS OF THE INVENTION

Bearing in mind the foregoing, it is among the objects of the present invention to provide a guide mechanism which may be utilized with a saw, router, or the like tool to define an ellipse cutting machine to enable the machining of elliptical cuts therewith in a workpiece; to provide such a guide which is simple and straightforward in use; to provide such a guide which is durable and accurate; to provide such a guide which enables the cutting of a wide range of ellipses; and which is easily adjusted.

Still further primary objects of the present invention, in addition to the foregoing objects, are the provision of such a guide which includes a trammel bar or beam in combination with a pair of crossed tracks which enables the making of elliptical cuts either larger or smaller than the crossed tracks, as desired; which may be quickly and easily adjusted for making concentric elliptical cuts; and which allows craftsmen to produce hollow ellipses for picture and mirror frames, table tops, inlays, carved decorations and the like.

The invention resides in the combination, construction, arrangement and disposition of the various component parts and elements incorporated in improved ellipse guides and cutting machines for cutting along elliptical paths in accordance with the principles of this invention. The present invention would be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially as they fall within the scope and spirit of the subjoined claims.

SUMMARY OF THE INVENTION

In accordance with the present invention a trammel beam carrying a pair of dove-tail shaped slider blocks rotatably carried on a pair of adjustable trammel points is attached to a workpiece support base which includes a pair of crossed right angle mutually perpendicular dove-tail tracks along which the slider blocks move as the trammel beam or workpiece support base are rotated relative one another. The trammel beam is provided with means permitting it to be mounted to a router or other cutting machine so that if the workpiece support base is attached to the surface of a workpiece, relative movement between the cutting machine and the workpiece will be restricted to an elliptical path as the movement is guided by the trammel. The means provided for mounting the trammel beam to the cutting machine permit either direct mounting of a machine such as a portable router for movement of the router around the workpiece or adjustably to a router table with the workpiece inverted between the trammel beam and the router table so that as the workpiece is rotated relative the trammel beam the workpiece will move along an elliptical path past the router cutter.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

DETAILED DESCRIPTION OF THE INVENTION

Figure 2:
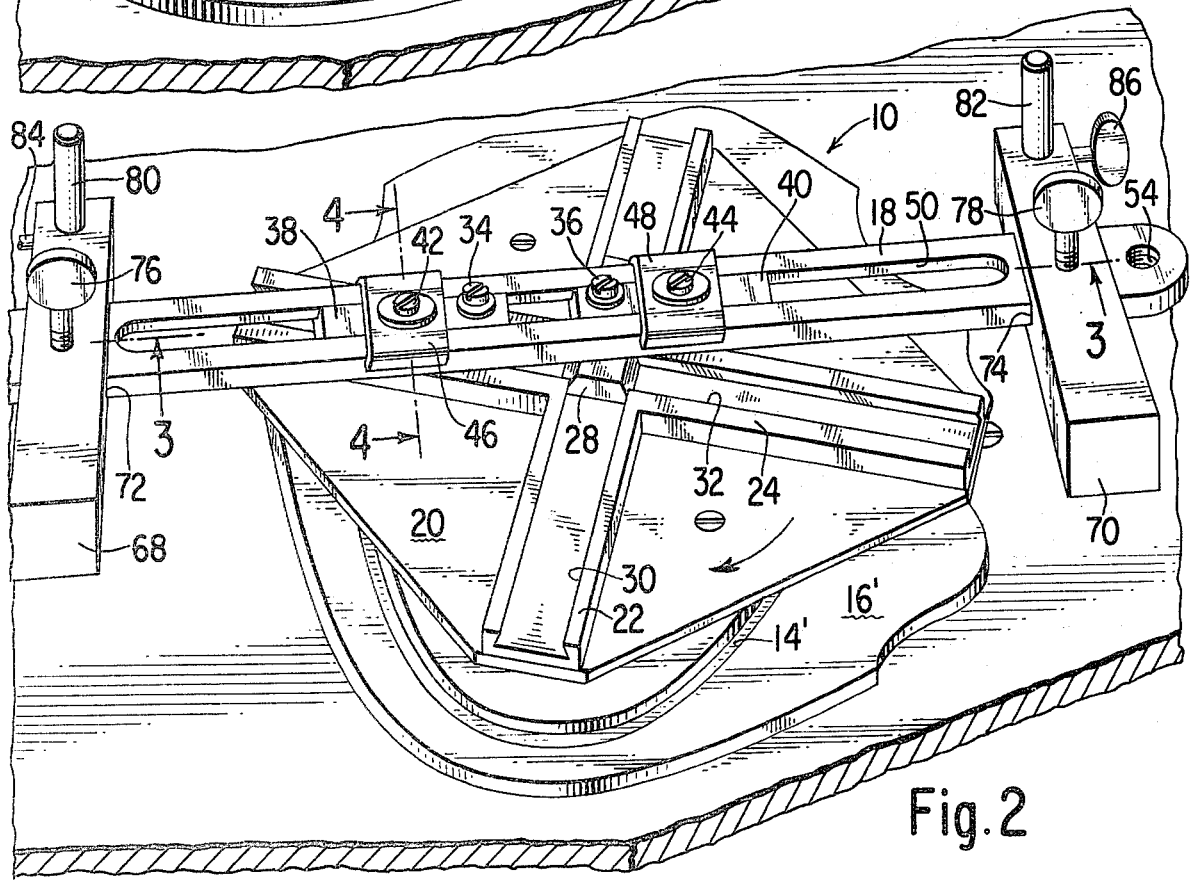
FIG. 2 is a perspective illustration, similar to FIG. 1, showing the ellipse cutting machine of the present invention with the trammel beam fixed to the surface of a router table so that a workpiece may be guided to move in an elliptical path past the router cutter.
Figures 3, 4:
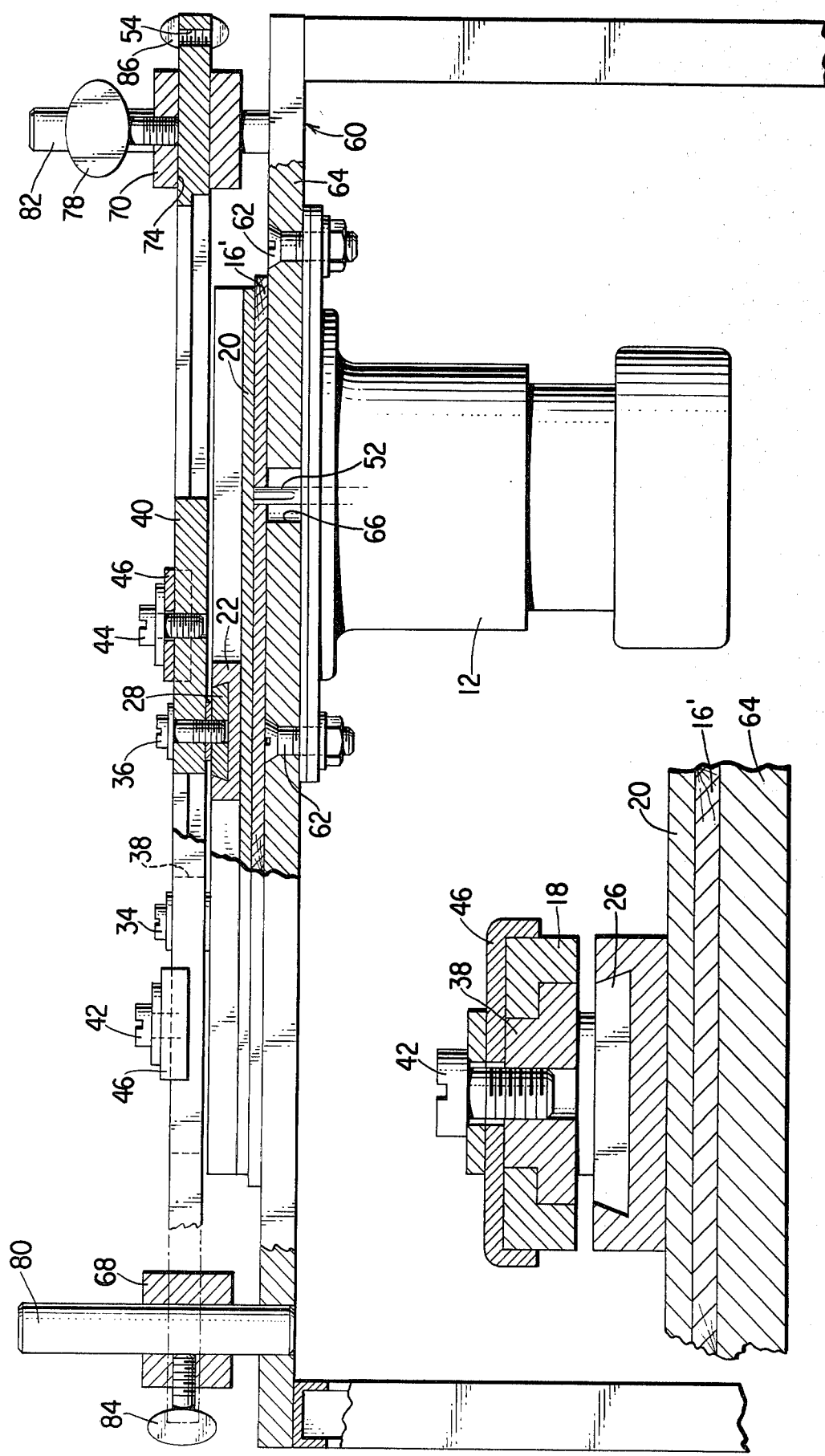
FIG. 3 is an enlarged elevational view, partially in section, taken along line 3—3 of FIG. 2.
FIG. 4 is an enlarged cross-sectional elevational view taken along line 4—4 of FIG. 2.

With reference now to the drawing, wherein like reference characters are utilized for like part throughout the several views, there is shown and illustrated an ellipse cutting machine comprising a trammel, designated generally by the reference character 10 for association with a router 12, or the like, for enabling the production of elliptical cuts, such as the cuts designated 14 (FIG. 1) or 14' (FIGS. 2–4) in the respective workpieces 16 and 16'. The trammel 10 comprises a trammel beam or bar 18 adapted to be associated with the router 12, as will be described hereinafter and a workpiece support base or member 20 adapted to be associated with the workpiece 16 or 16'. Connecting the trammel beam or bar 18 and the workpiece support base 20 are a pair of crossed tracks 22 and 24 fixedly associated with the workpiece support base 20 and a pair of slider blocks 26 and 28 adjustably and rotatably associated with the trammel beam or bar 18.

The tracks 22 and 24 are each provided with slidways 30 and 32, respectively, which are of a mating configuration to the sliders 26 and 28 and are preferably of a configuration such that the sliders 26 and 28 are locked vertically therewithin, such as by they being of mating dove-tail configuration. The slidways 30 and 32 are mutually perpendicular and define the directions of the major and minor axes of the desired ellipse. The sliders 26 and 28 are pivotally mounted with the trammel beam 18 as by being pivotally carried on pivot screws 34 and 36 defining spaced apart trammel points. The pivot screws 34 and 36 are respectively carried on adjustment or mounting blocks 38 and 40. The mounting blocks 38 and 40 are adjustably connected with the trammel beam 18, as by means of screws 42 and 44 extending through saddle straps 46 and 48. To accommodate the mounting blocks 38 and 40, the trammel beam 18 is provided with an elongated slot 50 which is of inverted T-shaped configuration, as is the cross section of the mounting blocks 38 and 40. As shown, washers are provided on the various screws 34, 36, 42 and 44.

The distance from the center line of the pivot screw 36 to the router bit 52 defines the minor axis of the ellipse produced while the distance between the screw 34 and the router bit 52 defines the length of a major axis. In use, the router is fixed to the trammel beam 18 and the adjustment or mounting blocks are also locked to the trammel beam 18. This fixes the sum of the distances from the two trammel points to the router bit as a constant and sliding movement of the slider blocks 26 and 28 in the slideways 30 and 32 generates an ellipse.

Figure 1:
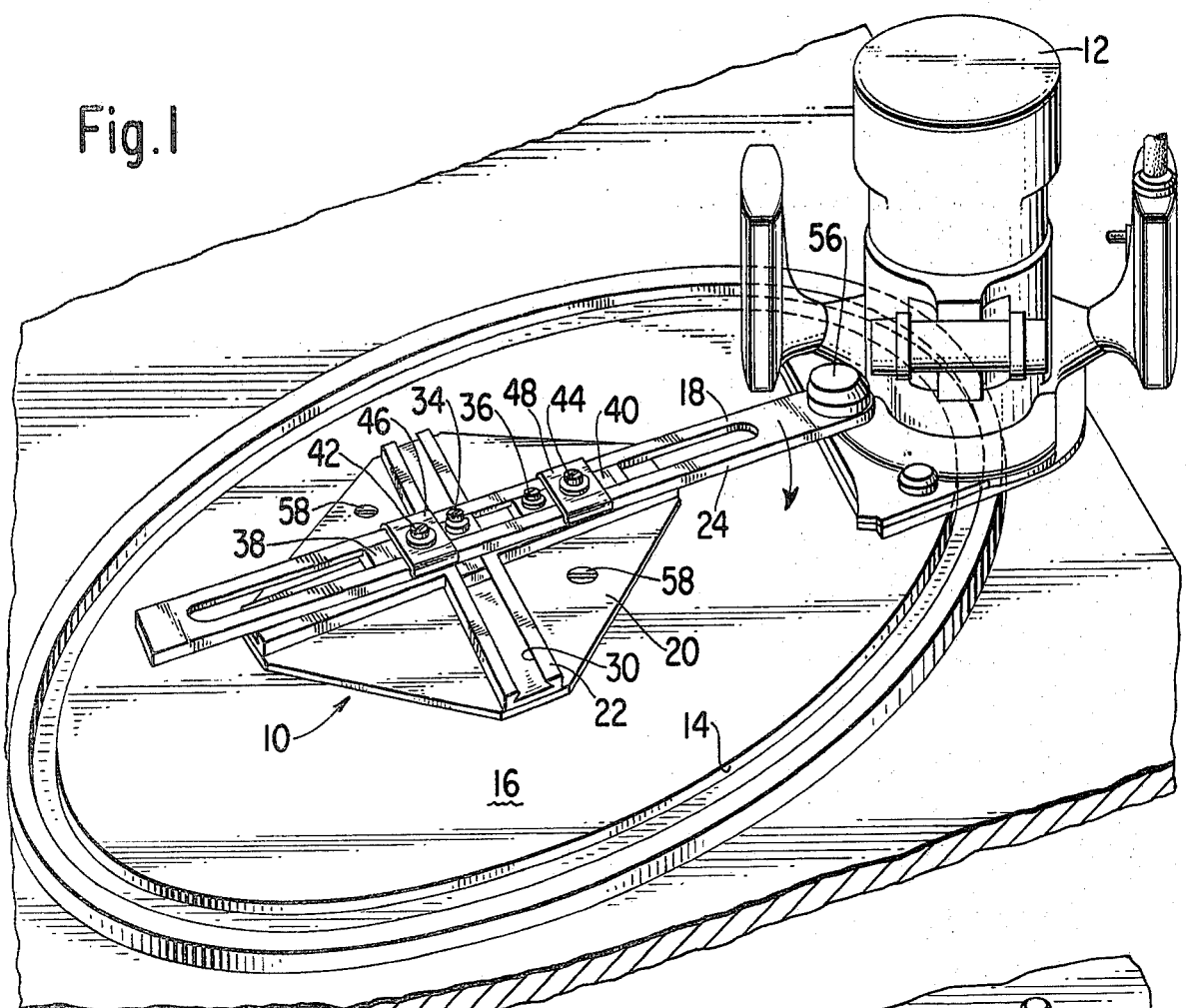
FIG. 1 is a perspective illustration showing the ellipse cutting machine of the present invention with the trammel beam attached to a portable router to guide the router in an elliptical path relative a fixed workpiece.

As heretofore pointed, the trammel 10 may be utilized in two ways. At one end portion of the trammel beam 18, there is provided an aperture 54 through which a screw 56 may be inserted to mount the router 12 to the trammel beam 18. If the workpiece support 20 is then secured to the workpiece 16, as shown in FIG. 1, as by means of screws 58, the router 12 may be moved around the workpiece support base 20 to cut the elliptical groove 14. During such cut the slider blocks 26 and 28 will reciprocate along the major and minor axes defined by the slideways 30 and 32 so as to maintain the router and, therefore, the router bit 52, constantly the set distances from the major and minor axes to thereby generate the elliptical cut. The workpiece support base 20 may be attached to the workpiece 16 by means other than screws 58. For example, nails or pins may used, an adhesive between the support 20 and workpiece 16, or the like.

Alternatively, the router 12 may be mounted to a router table, designated generally by the reference character 60, as by means of screws 62, the router table 60 having a support surface 64 provided with an aperture 66 to which the router bit 52 upwardly extends. The trammel 10 is then positioned above the router 12 and the ellipse cutting machine in this configuration further comprises a pair of elongated support blocks 68 and 70 provided with slots 72 and 74 through which the opposite ends of the trammel beam 18 extend to be adjustably positioned therein and therebetween so that the trammel points defined by the screws 34 and 36 may be positioned relative the router bit 52. Thumb screws 76 and 78 or the like are provided for locking the trammel bar 18 in position in the blocks 68 and 70.

The blocks 68 and 70, in turn, are positioned and supported on a pair of support posts 80 and 82 fixedly positioned extending vertically upwardly from the table top 64 of the router table 60. Thumb screws 84 and 86 may be provided to lock the blocks 68 and 70 on the posts 80 and 82 although they are not strictly necessary since it is not strictly necessary to lock the blocks 60 and 70 on the posts 80 and 82. Moreover, if the trammel bar 18 is made slightly flexible, the trammel 10 can be made "self-locking" on the posts 80 and 82 with the operator merely pressing slightly down on the blocks 68 and 70 to slightly arch the trammel beam 18. In use, the workpiece is again attached to the work support plate 20 and the workpiece 16' now moves along an elliptical path guided by the trammel device 10 past the router bit 52 to provide the elliptical cut. Concentric ellipses may be generated easily by moving the trammel beam 18 longitudinally within the mounting blocks 68 and 70. As pointed out, rather than a router, other cutting tools may be used.

Although the invention has been described in terms of a preferred embodiment or modification, such technical equivalents to the means described as well as their combination, and such other embodiments or modifications as may be suggested to those having the benefit of the teachings herein are intended to be reserved should they be carried out according to the spirit of the invention.

I claim:

1. Ellipse cutting machine comprising a trammel beam carrying a pair of slider blocks rotatably carried on a pair of adjustable trammel points attached to a workpiece support base which includes a pair of crossed right angle mutually perpendicular tracks along which said slider blocks move as said trammel beam or said workpiece support base are rotated relative one another, said trammel beam being provided with means for permitting it to be mounted to a cutting machine such as a router so that when said workpiece support base is attached to the surface of a workpiece, relative movement between the cutting machine and the workpiece will be restricted to an elliptical path as the movement is guided by said trammel beam wherein said means provided for mounting said trammel beam to the cutting machine permit alternatively both direct mounting of such cutting machine for movement of said machine around the workpiece and adjustable mounting thereof to a router table with the workpiece inverted between the trammel beam and the router table so that as the workpiece is rotated relative said trammel beam the workpiece will move along an elliptical path past the router cutter.

2. Ellipse cutting machine defined in claim 1 wherein said slider blocks and said tracks are of mating dove-tail cross sectional configuration.

3. Ellipse cutting machine defined in claim 1 wherein said tracks are each provided with slideways which are of a mating configuration to said sliders and are of a configuration such that said sliders are locked vertically therewithin, said sliders being pivotally mounted with said trammel beam by being pivotally carried on pivot screws defining said trammel points, said pivot screws being carried on mounting blocks adjustably connected with said trammel beam by screws extending through said trammel beam said trammel beam being provided with a longitudinally extending slot therefore.

4. Ellipse cutting machine defined in claim 3 further comprising a pair of elongated support blocks provided with slots through which the opposite ends of said trammel beam extend to be adjustably positioned therein and therebetween so that said trammel points may be positioned relative thereto said blocks in turn, being positioned and supported on a pair of support posts adapted to be fixedly positioned extending vertically upwardly from the table top of a router table.

5. Router attachment for cutting elliptical grooves in a workpiece comprising, in combination,
(a) an elongated trammel beam having an elongated generally medial slot extending generally longitudinally thereof of generally inverted T-shaped cross-sectional configuration and an aperture adjacent one end,
(b) a generally planar support base adapted to be removably joined to a workpiece,
(c) a pair of orthogonally crossed tracks carried by said support base, each of said tracks comprising a longitudinal slideway of dove-tail cross-sectional configuration,
(d) a pair of slider blocks of dove-tail cross-section configuration congruent to the cross-sectional configuration of the slideways, each of said slider blocks being slidable along a differing one of the slideways of said pair of tracks,
(e) a pair of mounting blocks having of generally inverted T-shaped configuration generally congruent said slot of said trammel beam and selectively positionable therealong,
(f) a pair of pivots, each of said pivots extending between one of said mounting blocks and one of said slider blocks so that said slider blocks may rotate relative said trammel beam as they slide back and forth in said slideways,
(g) workpiece mounting means for mounting said support base to a workpiece, and
(h) router mounting means for selectively mounting a router type tool with said trammel beam so as to be rigidly oriented relative thereto, said router mounting means being structured to enable said router to selectively be in one of two relationships, a first relationship wherein said router may be moved in an elliptical path around said support base and a second relationship wherein said router is fixedly positioned and said support base and the attached workpiece may be moved in an elliptical path past said router.

* * * * *